W. H. HATHAWAY.
Running-Gears.
No. 148,118.
Patented March 3, 1874.
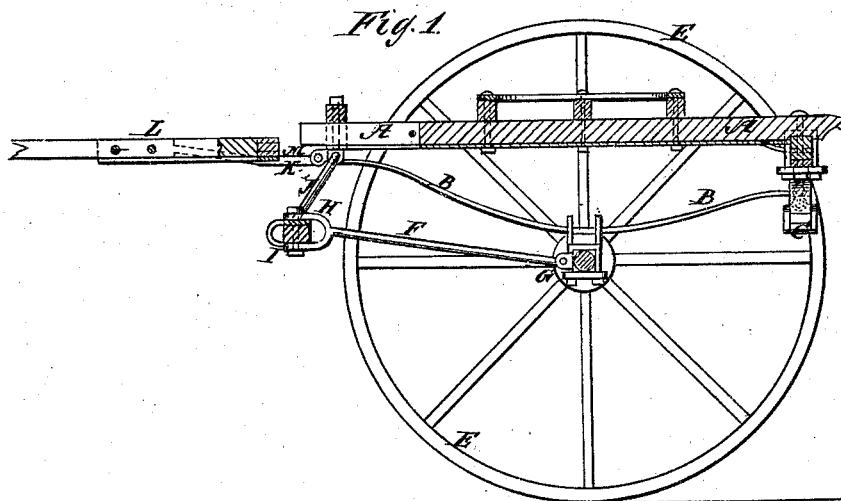
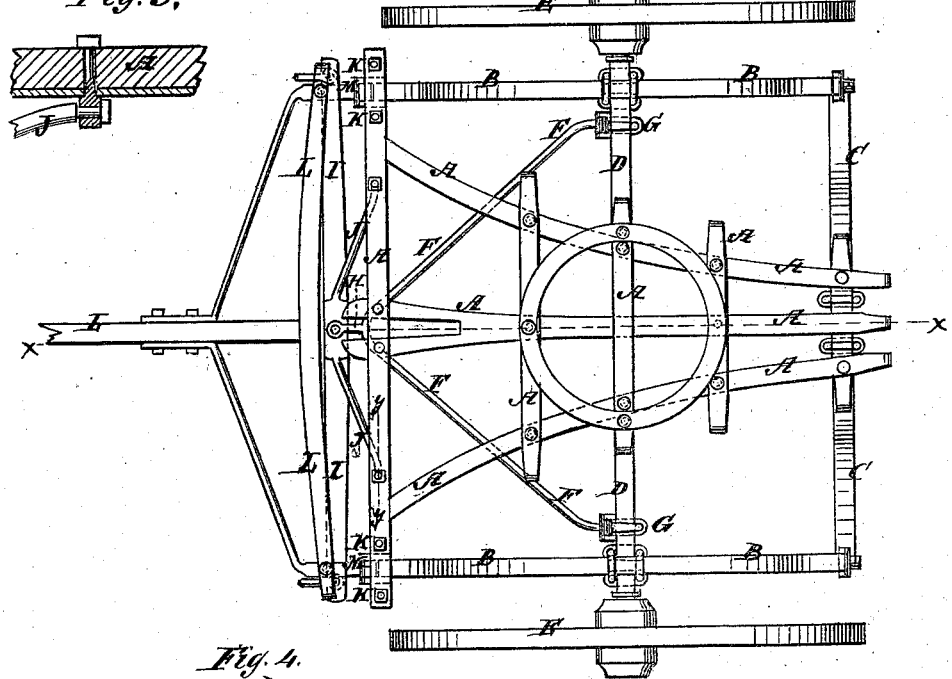
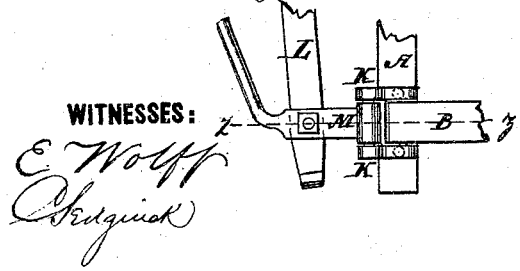
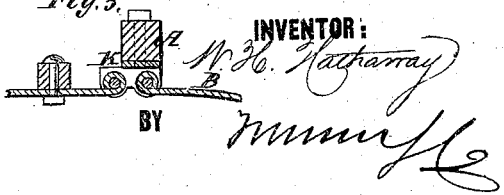
WITNESSES:
E. Wolff
Sedgwick
INVENTOR:
W. H. Hathaway
BY
ATTORNEYS.

UNITED STATES PATENT OFFICE.

WILLIAM H. HATHAWAY, OF EAST CLARIDON, OHIO.

IMPROVEMENT IN RUNNING-GEARS.

Specification forming part of Letters Patent No. 148,118, dated March 3, 1874; application filed February 7, 1874.

*To all whom it may concern:*

Be it known that I, WILLIAM H. HATHAWAY, of East Claridon, in the county of Geauga and State of Ohio, have invented a new and useful Improvement in Draft Attachment for Platform-Wagons, of which the following is a specification:

Figure 1 is a vertical longitudinal section of the forward part of the running-gear of a wagon to which my improvement has been applied, taken through the line $x\ x$, Fig. 2. Fig. 2 is a top view of the same. Fig. 3 is a detail section taken through the line $y\ y$, Fig. 2. Fig. 4 is an under-side view of a corner of the platform, showing the manner of attaching the spring and brace-bar of the pole or shafts. Fig. 5 is a detail section of the same, taken through the line $z\ z$, Fig. 4.

Similar letters of reference indicate corresponding parts.

My invention has for its object to furnish an improved draft attachment for platform-wagons, which shall be so constructed that the line of draft may be in a straight line from the horses' collars to the axle.

The invention consists in the draft-bars and clevis, constructed and arranged, in connection with the axle and platform of the vehicle, as hereinafter fully described; in the swing-supporting bar, jointed to the front bar of the platform, in combination with the clevis and the draw-bars, and in the double-eyed eyebolts, in combination with the platform, the platform-springs, and the brace-irons of the pole or shafts, as hereinafter fully described.

A is the platform; B are the side springs; C is the rear spring; D is the axle, and E are the wheels, about the construction of which parts there is nothing new. F are the draft-rods, the rear ends of which are connected with the axle D, near its ends, by ordinary axle-clips G. The forward ends of the draft-rods F meet and are securely welded to each other, and to the clevis H, to which the double-tree I is pivoted when two horses are used, and the whiffletree when one horse is used. The double-tree H and the forward ends of the draft-rods F are supported by the swing-bar J, the middle part of which passes beneath the upper arm of the clevis H, and is secured to the said clevis and to the double-tree I by the bolt that pivots said double-tree to the said clevis. The end parts of the swing rod or bar J curve upward and outward, and the ends rest against the under side of the front bar of the platform A, and pass through eyebolts or staples attached to said platform-bar, forming a joint, to allow the double-tree to move forward and back relatively to the front bar of the platform, as the said platform moves up and down upon its springs. The improvement may be used with a brace-pole or shafts, L, as shown in the drawings, or with a slide-pole, as indicated by the slot in the forward end of the center bar of the platform A. In the first case, the rear ends of the brace-irons M of the said pole are pivoted by bolts to the forward eyes of the double-eyed eyebolts K, attached to the ends of the front bar of the platform A, the rear eyes of which receive the bolts that pass through the eyes of the forward ends of the side springs B. The forward eyes of the double-eyed eyebolts K should project in front of the front bar of the platform A, so that the pole or shafts may be free to move up and down, and so that the weight upon the platform may bear squarely upon the ends of the springs B. By this construction, should the wheels drop into a hole or rut, the tendency of the draft will be to lift, and not to draw downward, as is the tendency with the ordinary manner of attaching the draft.

Having thus described my invention, I claim as new, and desire to secure by Letters Patent—

1. The draft-bars F and clevis H, in combination with the axle D and platform A, substantially as shown and described.

2. The swing-bar J, jointed to the front bar of the platform A, in combination with the clevis H and draw-bars F, substantially as shown and described.

3. The double-eyed eyebolts K, in combination with the platform A, springs B, and the brace-irons M, substantially as described.

WILLIAM HENRY HATHAWAY.

Witnesses:
JOSHUA BENNETT,
W. W. MORSE.